July 12, 1966  E. V. GARNETT ETAL  3,260,443
BLOWER
Filed Jan. 13, 1964  7 Sheets-Sheet 1

INVENTOR.
EDWARD V. GARNETT
ARNOLD C. BISHARD
BY
Sheridan and Ross
ATTORNEYS

July 12, 1966  E. V. GARNETT ET AL  3,260,443
BLOWER

Filed Jan. 13, 1964  7 Sheets-Sheet 2

INVENTOR.
EDWARD V. GARNETT
ARNOLD C. BISHARD
BY
Sheridan and Ross
ATTORNEYS

United States Patent Office 3,260,443
Patented July 12, 1966

1

3,260,443
BLOWER
Edward V. Garnett, Denver, Colo., and Arnold C. Bishard, Lubbock, Tex., assignors to R. W. Kimbell, Earth, Tex.
Filed Jan. 13, 1964, Ser. No. 337,228
7 Claims. (Cl. 230—134)

The present application is a continuation-in-part of our prior patent application Serial No. 173,913, filed on February 19, 1962, now abandoned.

This invention relates generally to blowers and turbo-machines and more particularly to a centrifugal type turbo-machine having a unique blade configuration resulting in improved operating efficiency, increased pressure and volume output and an impeller inexpensive to manufacture.

Turbo-machines of the centrifugal type are broadly classified into three categories—wheels with radial tip blades, blades curved forwardly at their exit edges and blades curved backwardly at their exit edges. Radially bladed centrifugal machines are characterized by their low efficiency and moderate pressure output. Forwardly curved bladed centrifugal machines operate at a higher efficiency than does the radially bladed machines and are characterized by their high volume output. Backwardly curved bladed centrifugal machines normally generate less volume than does the forwardly curved bladed machine and are characterized by higher mechanical efficiencies and faster operating speeds.

Conventionally available turbo-machines of the centrifugal type have a fan efficiency usually between 45 percent and 75 percent according to type. As a class, such machines are characterized by either high volume output or high pressure output but not both, at least not with the degree of efficiency required for continuous operation thereof. Consequently, high volume and high pressure requirements were obtained previously by operating two or more units in series, which resulted in increasing the cost of the overall unit, or by operating conventional units well outside their normal and efficient operating range, which adversely affected the cost of operation. It has been discovered, however, that a turbo-machine of the centrifugal type can be made to operate at an improved efficiency as high as 84 percent and yet produce an unusually high combined pressure and volume output. This unexpected improvement in turbo-machine performance is obtained by incorporating two or more blades within a turbo-machine impeller of the centrifugal type where each blade has means including a backwardly curved portion formed only on the rearward part thereof to provide a substantially uniform expansion of a pressurized fluid that may flow through the impeller such that the ratio of the density of the fluid at the impeller outlet to the density of the fluid immediately upstream of the backwardly curved portion is between 0.825 and 0.915.

Accordingly, one of the principal objects of this invention is to provide a centrifugal type turbo-machine inexpensive to build and having a substantially improved operating efficiency.

Another object of this invention is to provide an improved turbo-machine impeller of the centrifugal type having at least two blades projecting radially outwardly therefrom, each said blade having means including a backwardly curved portion formed only on the rearward part thereof to provide a substantially uniform expansion of a pressurized fluid that may flow through the impeller such that the ratio of the density of the fluid at the impeller outlet to the density of the fluid immediately upstream of the backwardly curved portion is between 0.825 and 0.915.

Another object of this invention is to provide a turbo-machine impeller of the centrifugal type having at least two blades projecting radially outwardly from said impeller, each said blade having means including a backwardly curved portion formed only on the rearward part thereof to provide a substantially uniform expansion of the pressurized fluid that may flow through the impeller such that the ratio of the density of the fluid at the impeller outlet to the density of the fluid immediately upstream of said backwardly curved portion is between 0.825 and 0.915 and a plane disposed normal to the blade tip of said backwardly curved portion intersects a plane disposed tangent to the periphery of the outlet of said impeller at the point of intersection between said backwardly curved portion and the periphery of the outlet to form an included angle varying within a range of 20° and 35°.

Another object of this invention is to provide a turbo-machine impeller through a substantial portion of which a fluid first expands at a substantially uniform rate as the fluid changes direction somewhat perpendicular to the axis of rotation, then contracts at a substantially uniform rate and then prior to discharge thereof expands a predetermined amount at a substantially uniform rate.

Another object of this invention is to provide a turbo-machine impeller of the centrifugal type comprising an integrally cast hub section, blades and outer section.

Additional objects and the novel features of this invention will become apparent from the description which follows, taken in conjunction with the accompanying drawings, in which:

Figure 1:
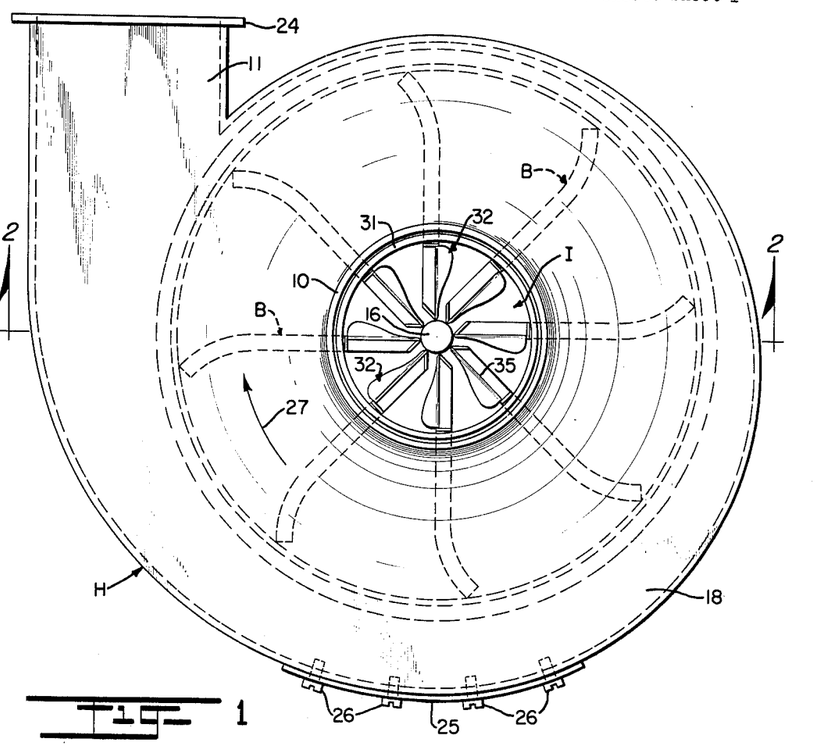
FIG. 1 is a side elevation of one embodiment of a turbo-machine constructed in accordance with this invention, looking toward the inlet thereof.
Figure 2:
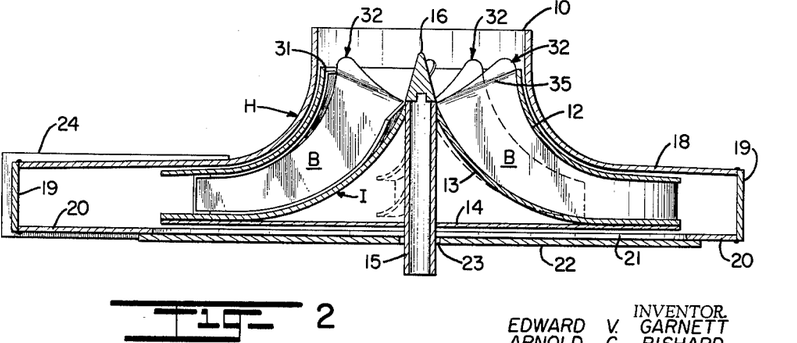
FIG. 2 is a horizontal section, taken along line 2—2 of FIG. 1, showing particularly the hub and the shroud construction of the impeller.
Figure 3:
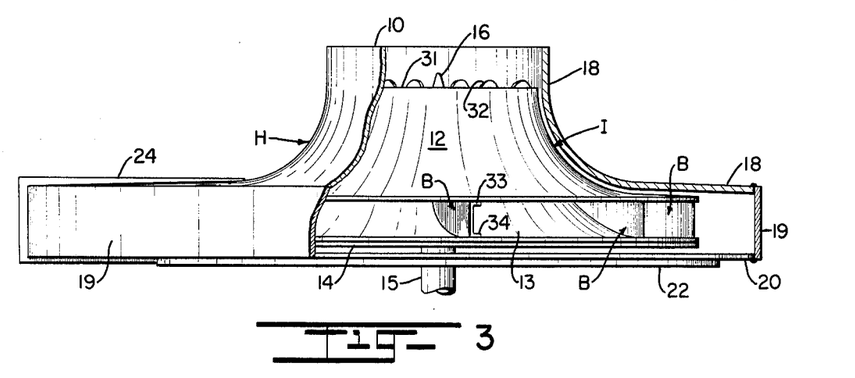
FIG. 3 is a bottom view of the turbo-machine of FIG. 1, with the housing partly broken away to show additional details of the construction of the impeller.

In accordance with this invention, a blower or turbomachine of the centrifugal type forming one embodiment thereof includes a stationary housing H of FIGS. 1 and 2, having a central, circular inlet 10 in one side and an outlet 11 which extends tangentially and may be directed upwardly, as shown, or in any other desired direction. The blower has a rotating impeller I which are shown in FIG. 2 includes a plurality of blades B disposed between an outer shroud 12 and an inner shroud 13 which, along with an annular base plate 14, is mounted on a hollow sleeve 15. Sleeve 15 is adapted to fit over the shaft of a conventional drive motor (not shown), while a cone 16 is preferably positioned at the inner end of sleeve 15. The use of a cone 16 as shown is desirable since it beneficially directs the air into individual flow paths in the impeller. The housing H includes a front wall 18 which is cylindrical at inlet 10 and curves laterally outwardly, as in FIG. 2, to a peripheral side wall 19, which is conveniently formed separately and attached thereto, as by welding, as shown. A rear wall 20 is attached to the edge of side wall 19, as by welding, and has a large opening 21, normally closed by a cover plate 22, as shown in FIG. 2. Front wall 18 and rear wall 20 have the extent shown in FIG. 1, to provide outlet 11, the periphery of each thus following an increasing radius from the top and counterclockwise, as viewed in FIG. 1, around the bottom and to the offset outlet 11. During assembly, the impeller may be slipped into the housing through opening 21 and the opening closed by plate 22, which has a smaller central opening 23 through which sleeve 15 extends. As in FIG. 1, the outlet 11 is provided with a flange 24 at the upper end thereof for attachment to a suitable exhaust duct (not shown). An access opening is provided at the bottom of side wall 19 to permit the removal of lint, dust and other debris which may collect within the housing, and is closed by a removable cover 25 which is held in place by a plurality of cap screws 26, as in FIG. 1.

Advantageously, blades B are mounted, as by welding, within inner shroud 13 and outer shroud 12. It will be noted that both the inner and outer shrouds conform to the radius of a circle, the radius of curvature of inner shroud 13 being greater than that of outer shroud 12. The impeller I is rotated in the direction of arrow 27 of FIG. 1. Conveniently, the outer end of inner shroud 13 is attached to circular base plate 14, also attached to shaft sleeve 15, while cone 16 is attached to the outer end of sleeve 15 to deflect the incoming air toward the blades B without producing undesirable air turbulence or eddy currents.

Figure 4:
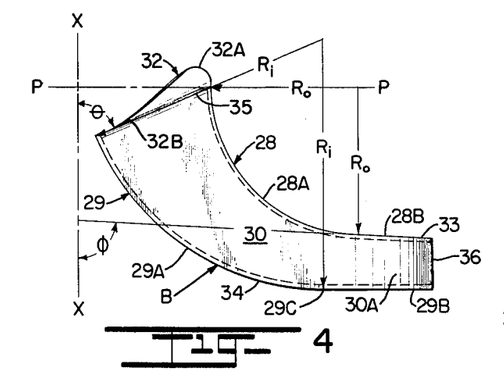
FIG. 4 is an enlarged side elevation of one embodiment of a blade constructed in accordance with this invention.
Figure 5:
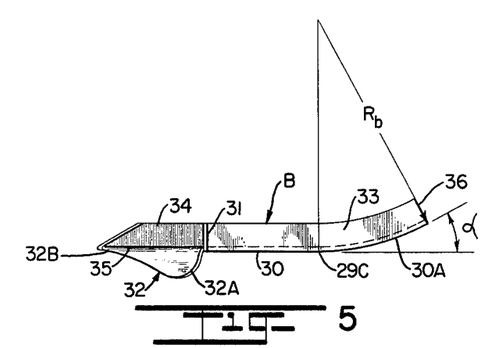
FIG. 5 is a top plan view of the blade shown in FIG. 4.
Figure 6:
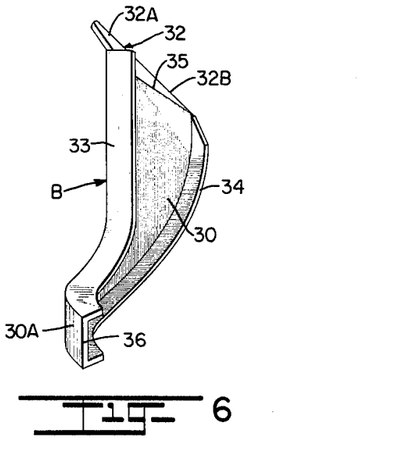
FIG. 6 is a perspective view of the blade shown in FIG. 4.

The contour of the blades B may best be seen in FIGS. 4–6. Thus, each blade B is provided with a side wall 30 which is higher at the forward portion thereof than at the rearward portion and the edges thereof conform to the spacing between shrouds 12 and 13. Each side wall 30 is conveniently planar except for the rearward portion 30a thereof, which curves rearwardly, i.e., away from the direction of rotation, to provide a smoother impetus to the air as it leaves the impeller, while the forward portion terminates in a forwardly extending triangular-shaped, lip 32 for gathering the air and directing it into the blades. For convenience in attachment, as by welding, to shrouds 12 and 13, the outer edge of side wall 30 terminates in an inturned flanges 33 while the inner edge terminates in an inturned flange 34. Each blade B is conveniently formed to shape from a single piece of metal, such as steel, of which the shrouds 12 and 13 are also conveniently made, to facilitate welding.

Each blade has an outer edge 28 comprising an arcuate forward portion 28a having a substantially constant radius of a curvature $R_0$ and a rearward portion 28b lying in a plane the extension of which forms an included angle $\phi$ with the axis of rotation X—X of the impeller I. The radius of curvature $R_0$ is maintained within a range of 0.09 and 0.27 times the diameter D of the impeller's outlet. Excellent results have been obtained where a radius of curvature $R_0$ of approximately 0.18, i.e., 0.18±0.03, times the diameter D of the impeller's outlet has been used. The center for the radius of curvature $R_0$ lies in a plane P—P disposed normal to the axis of rotation X—X of said impeller and which contains the periphery 31 of the inlet to the impeller, a portion of which is shown in FIG. 5. Said center is disposed radially outwardly from the axis of rotation of said impeller by an amount between 0.30 and 0.49 times the diameter D of the impeller's outlet and preferably by an amount of approximately 0.40, i.e., 0.40±0.03 times the diameter D of the impeller's outlet. The included angle $\phi$ is maintained between 81 and 90 degrees. Excellent results have been obtained where an included $\phi$ of approximately 86.5°, i.e., 86.5±½°, has been used.

Each blade also has an inner edge 29 comprising an arcuate forward portion 29a of a substantially constant radius of curvature $R_i$ and a rearward portion 29b lying in a plane disposed substantially normal to the impeller's axis of rotation. The radius of curvature $R_i$ is maintained within a range of 0.25 and 0.45 times the diameter D of the impeller's outlet. Excellent results have been obtained where a radius of a curvature $R_i$ of approximately 0.35, i.e., 0.35±0.03, times the diameter D of the impeller's outlet has been used. The center for the radius of curvature $R_i$ lies in a plane disposed normal to the axis of rotation of said impeller and which is positioned upstream from the periphery 31 of the impeller's inlet by an amount of approximately 0.09, i.e., 0.09±0.03, times the diameter D of the impeller's outlet. Said center is also disposed radially outwardly from the axis of rotation of said impeller by an amount between 0.25 and 0.45 times the diameter D of the impeller's outlet and preferably by an amount of approximately 0.35, i.e., 0.35±0.03, times the diameter D of the impeller's outlet.

The blade as shown in FIGS. 4–6 also has forward and trailing edges 35 and 36, respectively. The triangular-shaped lip 32, which is in actuality the leading edge, is shown forwardly inclined in the direction of rotation by an amount of approximately 30°. However, the lip 32 may be formed as an extension of the blade B without any inclination thereof. The base portion 32a of the lip 32 is arcuately formed and the apex portion 32b intersects the forward part of arcuately formed portion 29a of the inner edge 29 of the blade B. The forward edge 35 lies in a plane the extension of which forms an included angle $\theta$ with the axis of rotation of said impeller. The included angle $\theta$ is maintained between 55 and 65 degrees. Excellent results have been obtained with an included angle $\theta$ of approximately 60°, i.e., 60°±1°. The trailing edge 36 lies in a plane disposed parallel to the impeller's axis of rotation.

As previously stated, the rearward portion 30a of the blade is formed backwardly curved, i.e., it curves away from the direction of rotation. The rearward portion 30a is curved sufficiently to provide a substantially uniform expansion of a pressurized medium that may flow through the impeller whereby the ratio of the density of the fluid at the impeller's outlet or trailing edge 36 to the density of a pressurized medium immediately upstream of the beginning said backwardly curved portion is between 0.825 and 0.915. Excellent results have been obtained where the ratio of densities was approximately 0.87, i.e., 0.87±0.02. It has been found that an expansion of a pressurized medium or fluid in this manner, although resulting in a slight decrease in pressure output, greatly increases the mechanical efficiency, up to 84%, of the turbo-machine since the shock and eddy current losses normally resulting when there is a rapid, uncontrolled expansion of a pressurized fluid have been greatly minimized. As shown in FIG. 5, the backwardly curved portion 30a has a substantially constant radius of curvature $R_b$. The curvature of the rearward portion of the blade preferably begins at the junction 29c of the arcuately formed portion 29a with the rearward portion 29b of the inner edge 29 of the blade and extends toward and preferably to the trailing edge 36 of the blade. As viewed in FIG. 5, the angle $\alpha$ formed between a plane disposed normal to the axis of rotation of the impeller and containing therein the forward edge 35 of the blade and a plane disposed tangent to the curvature of the backwardly curved portion of the blade at the trailing edge 36 thereof is maintained between 20 and 35 degrees, and preferably between 25 and 30 degrees. Excellent results have been obtained where an angle $\alpha$ of approximately 27½°, i.e., 27½°±½°, was used. Although the degrees of curvature for the backwardly curved portion 30a is controlled by the amount of expansion of the pressurized medium desired, it has been found that a desired amount of expansion occurs when the radius of curvature $R_b$ is maintained between 0.25 and 0.43 times the diameter D of the impeller's outlet. Excellent results have been obtained where a radius of curvature $R_b$ of approximately 0.35, i.e., 0.35±0.03%, times the diameter D of the impeller's outlet has been used. The center for the radius of curvature $R_b$ lies in a plane disposed normal to the axis of rotation of said impeller and is disposed radially outwardly from the axis of rotation of said impeller by an amount between 0.25 and 0.45 times the diameter D of the impeller's outlet and preferably by an amount of approximately 0.35, i.e., 0.35±0.03%, times the diameter D of the impeller's outlet.

Preferably, the arcuate forward portion 29a of inner edge 29 extends radially outwardly from the impeller's axis of rotation until the fluid flowing through the impeller has made a complete 90 degree change in direction of flow as compared to its direction of flow upstream of the impeller's inlet. However, for some applications, it may be desirable to change the direction of flow to something less than 90 degrees. In this event, the rearward portion 29b of the inner edge 29 of the blade should preferably be tangent to the curvature of the rearward termination of the arcuate forward portion 29a rather than lying in a plane disposed normal to the axis of rotation of said impeller. Aside from making a corresponding angular change for the plane in which lies the rearward portion 28b of outer edge 28, the remaining construction details of the blades fall within the criteria as described herein.

By constructing an impeller having blades made in accordance with the above criteria, it has been found that the efficiency is greatly increased. Thus, when the electrical input of the motor, which drives the turbo-machine, was measured and compared with the volume of air passing through the impeller and the total pressure differential between the inlet and outlet in inches of water pressure, it was found that for a 31.625″ diameter impeller operating at 2850 r.p.m. and discharging through a scroll 11, an output of 8500 c.f.m. at 25.3 inches of water gage was obtained at an efficiency of 84%, and where the impeller discharged directly to the atmosphere, i.e., through a bell shaped impeller similar to that shown in FIGS. 11 and 12, at 2850 r.p.m. an output of 11,000 c.f.m. at 37.3 inches of water gage was obtained at an efficiency of 84%.

An alternative construction is shown in FIGS. 7–10, wherein the blades and shrouds of the impeller are made of aluminum, both for ease in formation and also to reduce the weight of the rotating impeller and thereby reduce vibration and balancing problems. In this embodiment, a housing H′, being stationary, may be formed of steel and is provided with a cylindrical inlet 37, a cone 38, and a front wall 39 which correspond to the front wall 18 of FIG. 1. As will be evident, cone 38 is much easier to form than the curvature of front wall 18 of FIG. 1, which may be formed in the same manner. The inlet 37, cone 38 and front wall 39 are conveniently welded together around the respective edges and the edge of a central hole in front wall 39, which corresponds to the larger end of cone 38. The peripheral contour of front wall 39 is similar to that of front wall 18 of FIG. 1, to provide an outlet (not shown) which is offset from the housing inlet in the same manner as outlet 11 of FIG. 1 is offset from inlet 10 in the first embodiment. A side wall 40 is attached, as by welding, to the peripheral edges of front wall 39 and a rear wall 41, which is similar to rear wall 20 of housing H, thus having an opening whose diameter is slightly greater than impeller I′ and over which a removable cover plate 42 is placed.

Figure 7:
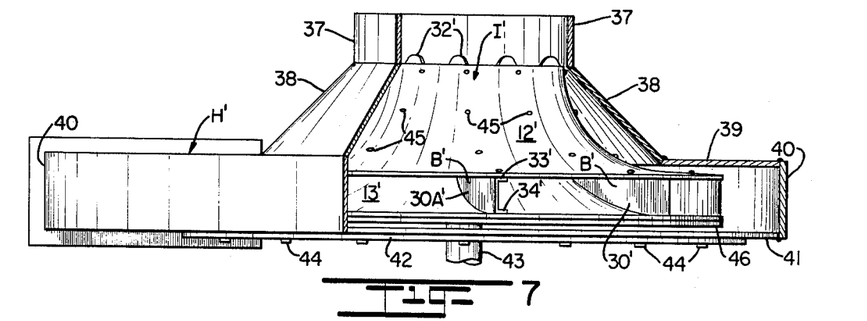
FIG. 7 is a bottom view, similar to FIG. 3, but showing the housing and impeller of an alternative embodiment.
Figure 9:
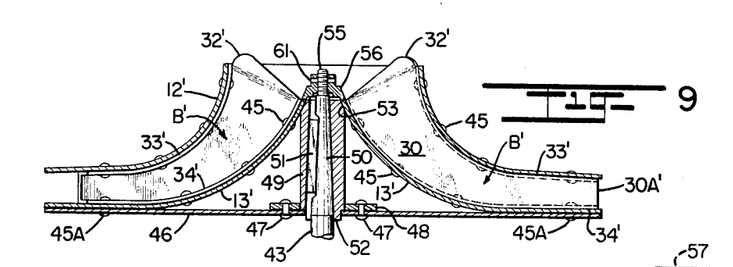
FIG. 9 is a horizontal section, taken along line 9—9 of FIG. 8, showing details of the impeller construction.

Impeller I′ is provided with an outer shroud 12′, an inner shroud 13′ and blades B′, similar to the corresponding parts of impeller I, but conveniently formed of aluminum or other light weight metal, the impeller being mounted on a shaft 43. During assembly, the impeller I′ may be inserted through the hole in rear wall 41 of housing H′ before cover plate 42 is put in place. Then, cover plate 42, which has a central opening through which shaft 43 extends, may be attached to rear wall 41 by bolts 44, so that the turbo-machine will be completely closed except for the inlet and outlet openings.

It will be noted that, as in the previous embodiment, the surface of both the inner and outer shrouds conform to the radius of curvature of a circle, the radius of curvature of inner shroud 13′ being greater than that of outer shroud 12′. The blades are dimensioned in accordance with the criteria previously described. The shrouds and the blades are conveniently made of aluminum and it is thus desirable to rivet the blades to the shrouds rather than weld them, as by rivets 45, since the aluminum could warp during welding, producing undesirable distortion and causing the impeller to be unbalanced. The blades B′ are readily formed to shape, as in a die, while the shrouds 12′ and 13′ are conveniently spun in a conventional manner to the desired radius of curvature. Blades B′ are, as previously stated, similar to blades B, each thus including a side wall 30′ having a rearward portion 30a′ thereof backwardly curved outer and a forwardly inclined lip 32′ at the forward portion thereof, while the edges of the side walls terminate in inturned flanges 33′ and 34′, through which rivets 45 extend. The blades and shrouds are conveniently riveted together and attached to a circular plate 46 by the outermost rivets 45a which attach the blades to the outer edge of inner shroud 13′. Plate 46 is conveniently attached, as by rivets 47, to an inner ring 48, for a purpose described later.

The blade and shroud assembly is conveniently mounted on a sleeve 49 which is tapered on the inside to engage the tapered end 50 of shaft 43, while the shaft and the inside of sleeve 49 are each provided with a keyway for a key 51. Conveniently, sleeve 49 is provided with a shoulder 52 at the inner end thereof for receiving the inner edge of plate 46, while ring 48 merely encircles the sleeve. The outer end of sleeve 49 is provided with a tapered shoulder 53 which engages the inner edge of shroud 13', as in FIG. 9. The inner end of shaft 43 terminates in a threaded projection 55 which extends beyond the end of sleeve 49 for attachment of a hub 56 adapted to hold the blade and shroud assembly in position. Hub 56 has internal threads in a bore 57 at one end, as in FIG. 10, which threadedly engage threaded projection 55 of shaft 43, and a counterbore 58 to accommodate the unthreaded portion of the shaft as sleeve 49 is moved onto the taper of the shaft. Hub 56 is also provided with a well having a flat surface 59 which engages the end of sleeve 49, to push it onto the shaft, and a tapered surface 60 at the edge of the well which clamps the edge of inner shroud 13' against shoulder 53 on sleeve 49. Furthermore, hub 56 is provided with a transverse hole 61 which may be aligned with a similar hole in threaded projection 55 of shaft 43 for installing a cotter pin (not shown) to prevent the hub from becoming loosened on the shaft.

Figures 8, 10:
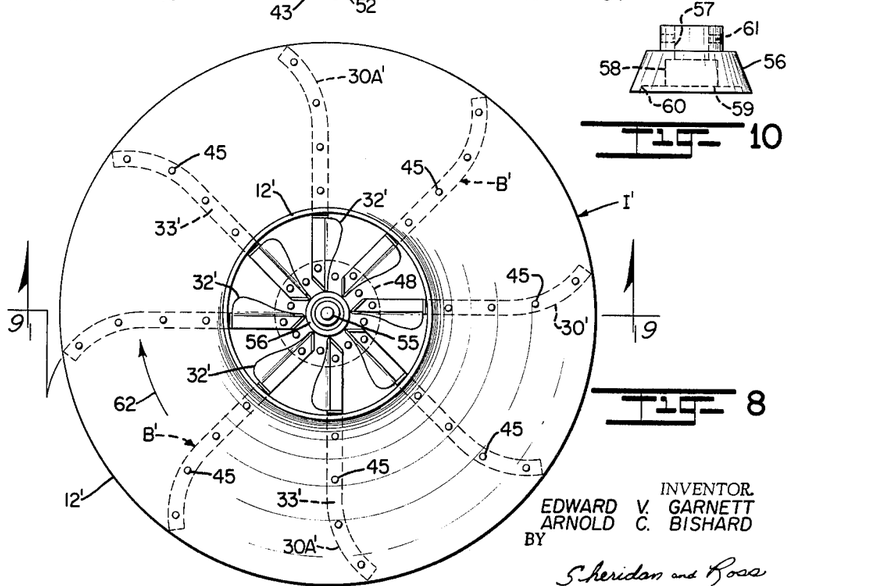
FIG. 8 is a side elevation looking toward the inlet of the impeller of the turbo-machine shown in FIG. 7.
FIG. 10 is a side elevation of the hub of the impeller of FIG. 9.

As will be evident from FIG. 8, as impeller I' is rotated in the direction of arrow 62, lips 32' of blades B' will assist in sucking and directing the air into the impeller from the space circumscribed by inlet 37 of housing H' and to the blades B'.

Figure 11:
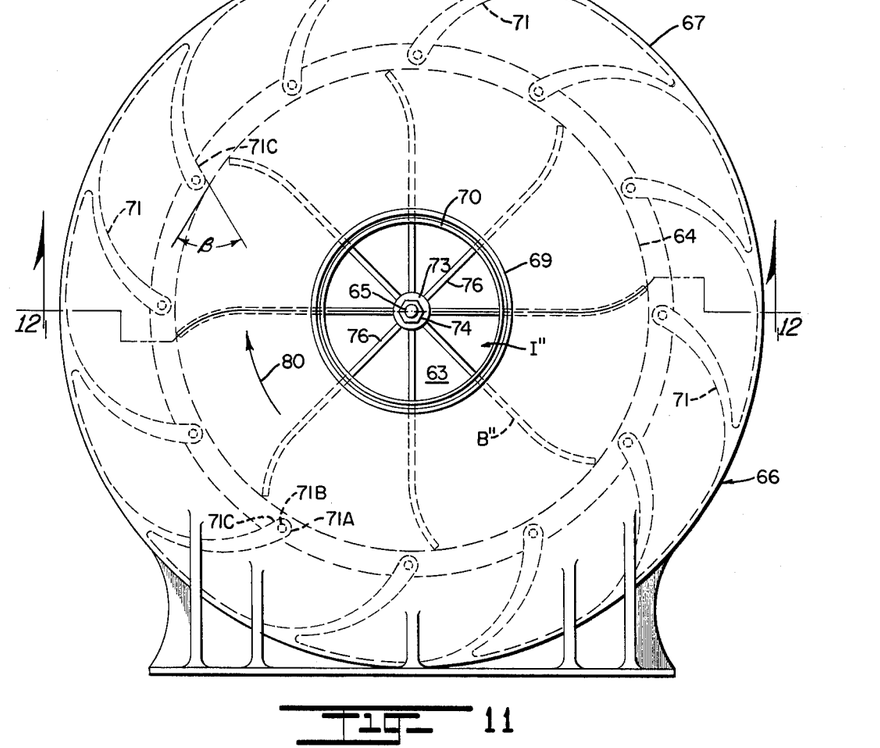
FIG. 11 is a side elevation of another embodiment of a turbo-machine constructed in accordance with this invention, looking toward the inlet thereof.
Figure 12:
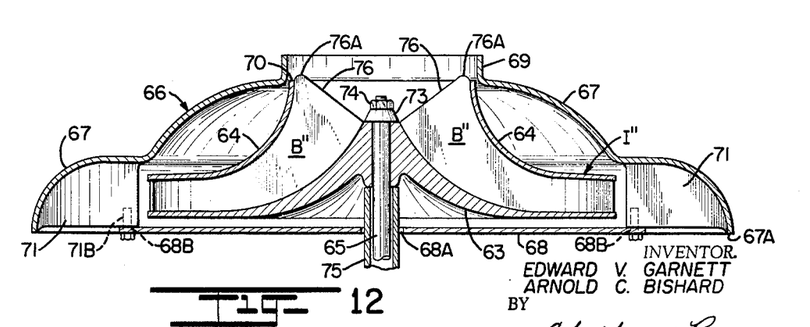
FIG. 12 is a horizontal section, taken along line 12—12 of FIG. 11.

Another alternative construction of a turbo-machine incorporating the principles of the instant invention is shown in FIGS. 11 and 12, in which the turbo-machine comprises an integrally cast impeller I'', comprising a hub section 63, blades B'' and an outer section 64, mounted upon a shaft 65 and disposed within a stationary housing 66 comprising a bell-shaped member 67 and a circular-shaped flat member 68.

The stationary housing 66 is not connected to the impeller I'' but merely encloses same as a safety measure to protect personnel from coming into contact with the rapidly rotating impeller and to prevent damage to the impeller should an object fall against or be thrown toward same. Additionally, the front part of the housing, bell-shaped member 67, cooperates with the impeller to minimize the flow of pressurized fluid from the impeller's outlet directly back to its inlet.

The bell-shaped member 67 has an annular, cylindrically shaped inlet portion 69 which projects axially upstream of the impeller's inlet 70. It is to be understood that clearance between impeller's unit 70 and the cylindrically shaped inlet portion 69 is held to a minimum. The bell-shaped member 67 is firmly anchored to support means (not shown) in any suitable manner, such as by the use of anchor bolts (not shown). Said member 67 has integrally formed on the back side thereof a plurality of fluid flow directing vanes or airfoil sections 71 spaced uniformly around the periphery thereof. Said airfoil sections 71 may be formed from the arc segments of either a circular or preferably a spiral curve and may even be formed without any curvature whatsoever, although the condition of no curvature is generally not preferred. The forward or leading edge of said airfoil section 71 begins at a distance, measured radially outwardly from the longitudinal axis of said bell-shaped member 67 of an amount slightly greater than one-half the diameter of the impeller's outlet and extends radially outwardly to the outlet periphery 67a of said bell-shaped member 67. As viewed in FIG. 12, the height of said airfoil sections 71 decreases as the radial distance from the longitudinal axis of member 67 increases. The inner portion 71a of each airfoil section 71 has a threaded, cylindrical, recess 71b formed therein and disposed parallel to the longitudinal axis of said member 67. The angle $\beta$ formed between a plane disposed both tangent to the impeller's outlet periphery and parallel to the axis of rotation of said impeller and a plane disposed parallel to the face 71c of said airfoil section 71 and tangent to the curvature of said face 71c at the forward or leading edge thereof, is maintained between 50 and 70 degrees and preferably between 55 and 65 degrees, although excellent results have been obtained when an angle or approximately 60 degrees plus or minus 2½ degrees has been used. The criteria controlling the selection of the angle $\beta$ is that the face 71c at the leading or forward edge of airfoil section 71 should be disposed in the same plane as the direction of the fluid flow as sames leaves the trailing edges of blades B'' of the impeller.

The circular-shaped, flat plate 68 has an opening 68a formed at the center thereof in which may be disposed the shaft 65 and a sleeve 75. Said plate 68 also has a plurality of openings 68b formed therein and uniformly spaced thereabout, the number equaling and the positioning coinciding with the number and position of threaded recesses 71b formed on the back side of bell-shaped member 67. Bolts 72 are used to attach firmly the circular-shaped, flat plate 68 to the bell-shaped member 67.

A frustum-shaped, annular member 73 is positioned on the forward end of shaft 65 and the lower surface thereof is in abutting engagement with an annular planar surface formed on the forward portion of the hub section 63 of the impeller I''. A nut 74 is threaded onto the forward portion of the shaft 65, said forward portion of said shaft being externally threaded, and holds the member 73 in firm abutting engagement against the hub section 63. An annular sleeve or bushing 75 is mounted upon the shaft 65 and disposed between the rearward portion of the hub section 63 and a bearing (not shown). Thus, the nut 74 and the sleeve 75 cooperate to position the impeller on the shaft 65.

Figure 15:
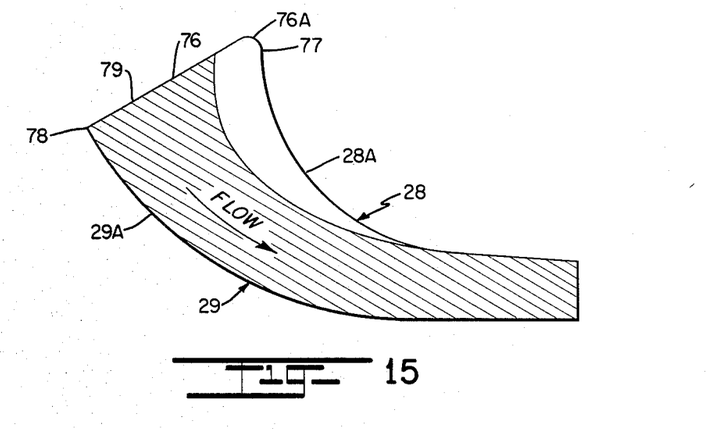
FIG. 15 is an enlarged view of the blade as shown in FIG. 12 and shows the volumetric distribution of a pressurized medium across the side wall of one blade as said medium flows through the impeller section.

The blades incorporated into the turbo-machine shown in FIGS. 11 and 12 are identical to the blade shown in FIGS. 4–6 except that none of said blades have any flanges formed thereon and the triangular shaped lip 76 is considerably foreshortened and is not forwardly inclined as compared to the blade shown in FIGS. 4–6. Although the triangular-shaped lip 76 may be dispensed with entirely, it has been found to be beneficial since the arcuate base portion 76a thereof which is disposed adjacent to the periphery 70 of the impeller's inlet minimizes the flow of pressurized fluid from the impeller's outlet to its inlet. As shown in FIG. 15, for the blade B'' the point of juncture 77 between the arcuate forward portion 28a of the outer edge 28 and the periphery of the arcuate base portion 76a or lip 76, the foremost portion 78 of the arcuate forward portion 29a of the inner edge 29 and the center for the radius of curvature $R_i$ (not shown) preferably all lie on the same line. A line interconnecting points 77 and 78 constitutes the forward edge of the blade B''. The center for the arcuate base portion 76a of lip 76 and the center for the radius of curvature $R_0$ (not shown) also preferably lie on the same line that is contained within a plane disposed normal to the impeller's axis of rotation. The foremost edge 79 of lip 76 is a straight edge connecting point 78 and disposed tangent to the periphery of the arcuate base portion 76a. Arcuate portion 76a has a radius of approximately 0.016 times the diameter D of the outlet of the impeller.

Figure 13:
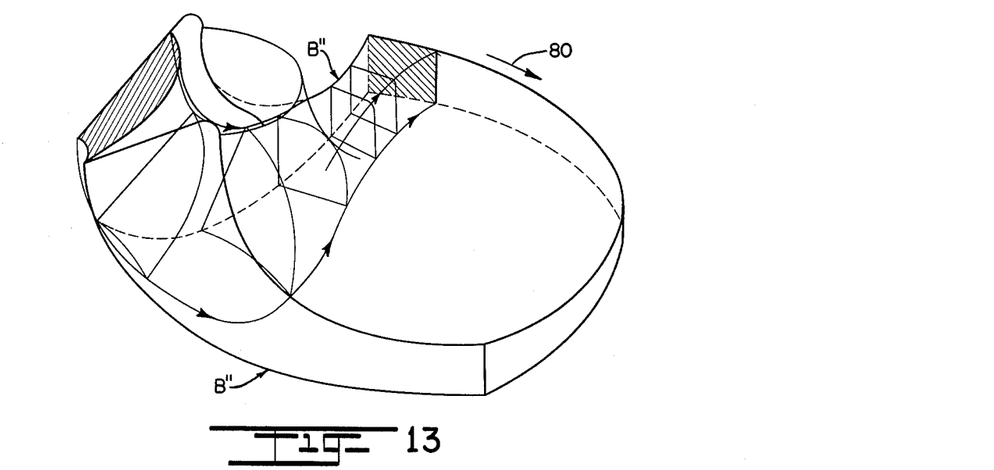
FIG. 13 is a perspective view of two adjacent blades as arranged in FIG. 11 and shows the volumetric distribution of a pressurized medium as it flows through the impeller section.
Figure 14:
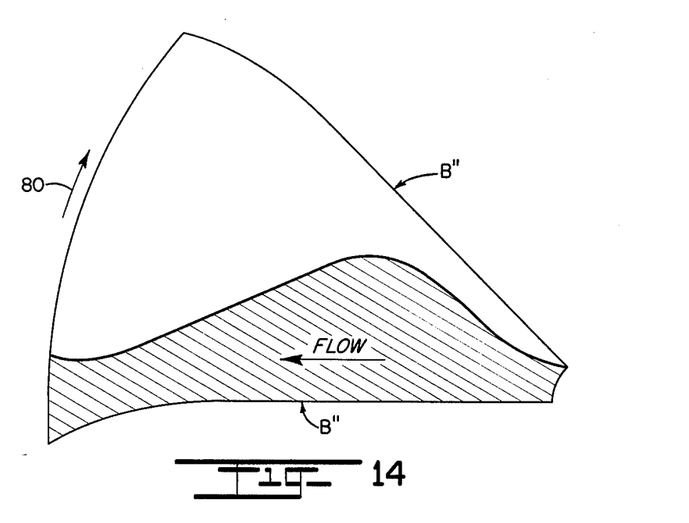
FIG. 14 is the same view of the blade as shown in FIG. 11 and shows the volumetric distribution of a pressurized medium forwardly of one blade as said medium flows through the impeller.
Figure 16:
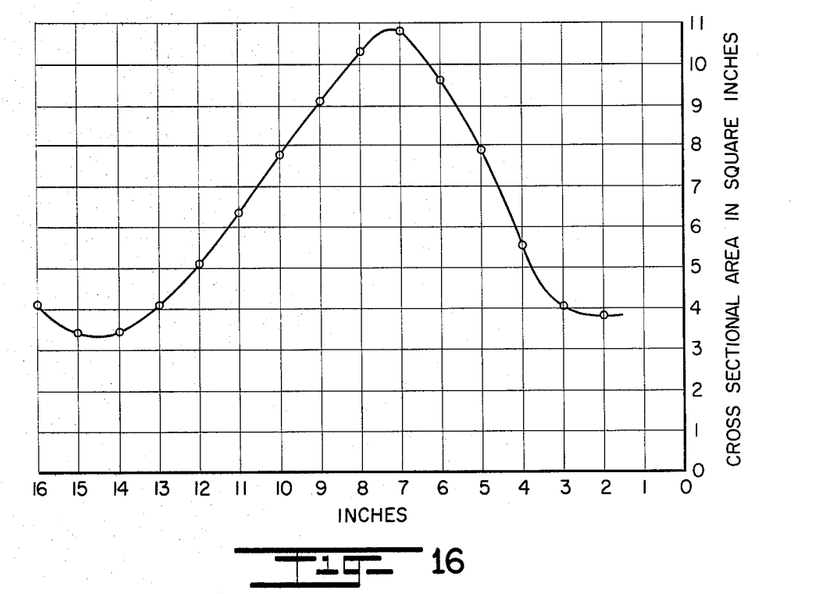
FIG. 16 is a graph showing the relationship between the cross sectional area of the pressurized medium passing through the impeller section plotted against the distance said area is positioned radially outwardly from the axis of rotation of said impeller.

FIGS. 13–15 show the volumetric displacement of fluid flow as the fluid passes through the impeller. FIG. 16 is a graphic diagram showing the relationship between the cross sectional area of the pressurized fluid passing through the impeller section plotted against the distance said area is positioned radially outwardly from the axis of rotation of said impeller. From FIGS. 13–16, it can readily be seen that almost immediately following the entry of the fluid into the impeller's inlet the fluid undergoes a substantially uniform expansion in conjunction with a change in direction of flow, see the substantially uniform change in cross sectional area between the distances of about 3.5 inches and 7.25 inches as measured radially outwardly from the impeller's axis of rotation as shown in FIG. 16, then the fluid undergoes a substantially uniform contraction, see the change in cross sectional area between the distances of about 7.25 inches and 11 inches as measured radially outwardly from the axis of rotation of said impeller, and then the fluid undergoes a substantially uniform expansion until the density thereof at the impeller's outlet is between 0.825 and 0.915 times the density of the fluid immediately upstream of the point where the last controlled expansion of the fluid begins. This latter phase of controlled expansion of the fluid is accomplished, at least in part, by backwardly curving the rearward part of the blade.

Figure 17:
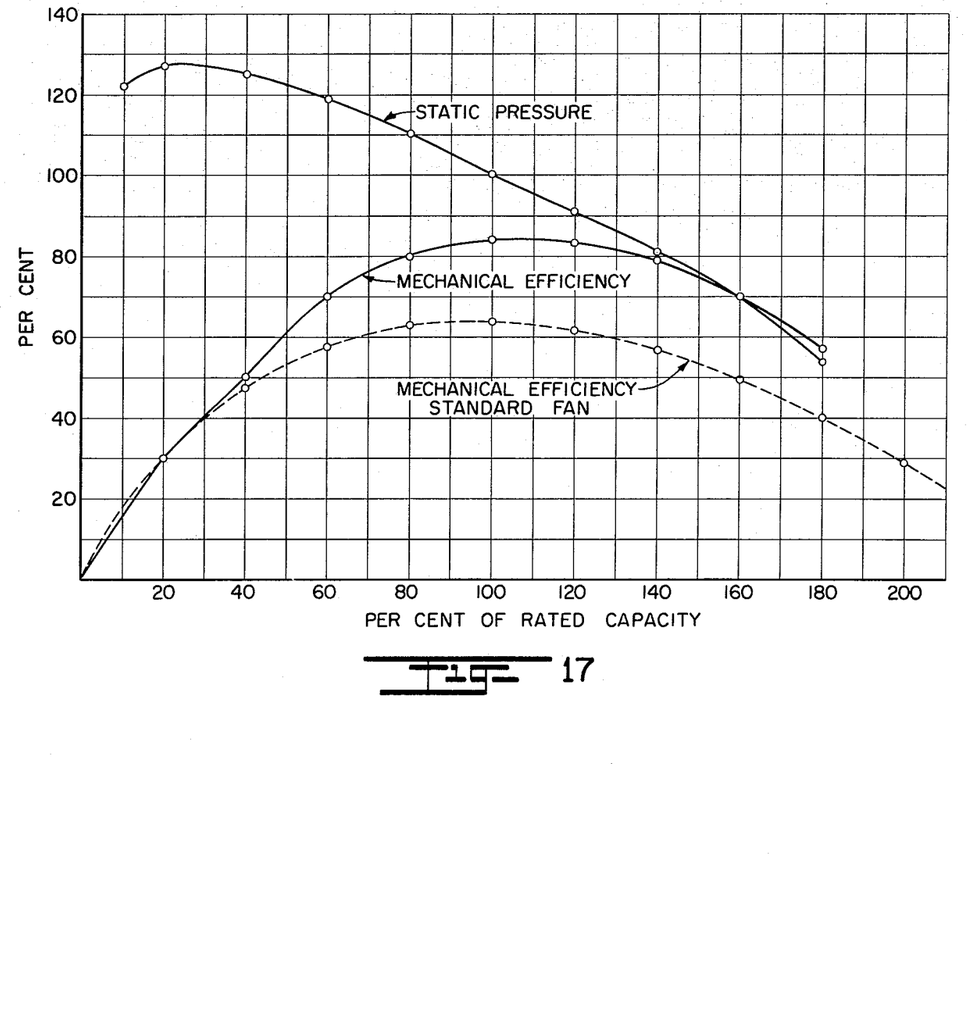
FIG. 17 is a graphic diagram comparing the mechanical efficiency of a turbo-machine of the centrifugal type constructed in accordance with this invention and a standard centrifugal type turbo-machine, and showing also the percent of rated static pressure versus percent of rated capacity of a turbo-machine constructed in accordance with this invention.

As is well known in the art, the pressure and flow coefficients are dimensionless numbers which collectively indicate the performance characteristics of a turbomachine. The pressure coefficient is a ratio of potential energy developed by an impeller to pressure energy corresponding to blade tip velocity, and the flow coefficient is the ratio of air flow velocity to behave tip velocity. The pressure and flow coefficients for a typical backwardly curved, centrifugal turbo-machine varies within ranges, respectively, of 0.60–1.10 and 0.09–0.30. However, a centrifugal turbomachine constructed in accordance with this invention has a flow coefficient of approximately 0.89 and a pressure coefficient of approximately 1.2, both values of which are substantially greater than the values obtained for typical backwardly curved centrifugal turbo-machines. FIG. 17 shows the comparison between a typically backwardly curved, centrifugal turbomachine and a turbo-machine constructed in accordance with the instant invention, showing the relative efficiency and static pressure, measured in inches of water gage, for corresponding flow rates. As shown in FIG. 17, a turbo-machine constructed in accordance with the instant invention operates at a substantially increased efficiency rate. Additionally, a turbo-machine constructed in accordance with the instant invention produces a greater static pressure for the same flow rate; however, since the static pressure is shown as a percent of rated static pressure rather than actual static pressure, a graphic comparison similar to that shown for the mechanical efficiencies cannot similarly be made.

From the foregoing, it will be readily appreciated that an improved turbo-machine impeller of the centrifugal type having a unique blade construction inexpensive to manufacture, which can be made to operate at efficiencies as high as 84% and yet produce an unusually high combined pressure and volume output has been described. A turbo-machine constructed in accordance with the instant invention may be used in a large number of varying applications and has also been found to be particularly beneficial where it is desirable to produce a comparatively high vacuum in a duct system.

It is to be understood that this invention is not to be limited to the exact embodiments of the device shown and described, which is merely by way of illustration and not limitation, as various other forms of modifications will be apparent to those skilled in the art.

We claim:

1. A turbo-machine impeller of the centrifugal type having an inlet, an outlet, a hub section connected to an outer section by a plurality of blades projecting radially outwardly from said hub section, each said blade having an outer edge comprising an arcuate forward portion having a substantially constant radius of curvature and a rearward portion lying in a plane the extension of which forms an included angle between 81° and 90° with the axis of rotation of said impeller, the center of said radius of curvature lying in a plane disposed normal to the axis of rotation of said impeller and containing the periphery of the inlet, said center being disposed radially outward from said axis of rotation by an amount between 0.30 and 0.49 times the outlet diameter of said impeller; an inner edge comprising an arcuate forward portion having a substantially constant radius of curvature and a rearward portion lying in a plane disposed substantially normal to the axis of rotation of said impeller, the center of said radius of curvature lying in a plane disposed normal to the axis of rotation of said impeller and upstream of a plane containing the periphery of said inlet by an amount between 0.06 and 0.12 times the outlet diameter of said impeller, said center being disposed radially outward from said axis of rotation by an amount between 0.25 and 0.45 times the outlet diameter of said impeller; and a rearward portion formed arcuately backwardly curved to provide a substantially uniform expansion of a pressurized fluid that may flow through the impeller such that the ratio of the density of the fluid at the impeller outlet to the density of the fluid immediately upstream of said backwardly curved portion is between 0.825 and 0.915.

2. A turbo-machine impeller as described in claim 1 in which the rearward part of said backwardly curved portion lies in a plane the extension of which forms an included angle between 20 and 35 degrees with a plane disposed normal to the axis of rotation of said impeller and in which lies the forward edge of said blade.

3. A turbo-machine impeller as described in claim 1 in which the ratio of densities is approximately 0.87 and the rearward part of said backwardly curved portion lies in a plane the extension of which forms an included angle between 25 and 30 degrees with a plane disposed normal to the axis of rotation of said impeller and in which lies the forward edge of said blade.

4. A turbo-machine as described in claim 3 in which the rearward part of said backwardly curved portion lies in a plane the extension of which forms an included angle of approximately 27½ degrees with a plane disposed normal to the axis of rotation of said impeller and in which lies the forward edge of said blade.

5. A turbo-machine impeller of the centrifugal type having an inlet, an outlet, a hub section connected to an outer section by a plurality of blades projecting radially outwardly from said hub section, each said blade having an outer edge comprising an arcuate forward portion having a substantially constant radius of curvature and a rearward portion lying in a plane the extension of which forms an included angle of approximately 86.5 degrees with the axis of rotation of said impeller, the center of said radius of curvature lying in a plane disposed normal to the axis of rotation of said impeller and containing the periphery of the inlet, said center being disposed radially outward from said axis of rotation by an amount of approximately 0.40 times the outlet diameter of said impeller; an inner edge comprising an arcuate forward portion having a substantially constant radius of curvature and a rearward portion lying in a plane disposed substantially normal to the axis of rotation of said impeller, the center of said radius of curvature lying in a plane disposed normal to the axis of rotation of said impeller and upstream of a plane containing the periphery of said inlet by an amount of approximately 0.09 times the outlet diameter of said impeller, said center being disposed radially outward from said axis of rotation by an amount of approximately 0.35 times the outlet diameter of said impeller; and a rearward portion formed arcuately backwardly curved to provide a substantially uniform expansion of a pressurized fluid that may flow through the impeller such that the ratio of the density of the fluid at the impeller outlet to the density of the fluid immediately upstream of said backwardly curved portion is approximately 0.87.

6. A turbo-machine impeller as described in claim 5 in which the rearward part of said backwardly curved portion lies in a plane the extension of which forms an included angle between 25 and 30 degrees with a plane disposed normal to the axis of rotation of said impeller and in which lies the forward edge of said blade.

7. A turbo-machine impeller as described in claim 6 in which the forward edge of each blade lies in a plane the extension of which forms an included angle between 55 and 65 degrees with the axis of rotation of said impeller.

References Cited by the Examiner

UNITED STATES PATENTS

| | | | |
|---|---|---|---|
| 909,863 | 1/1909 | Bowie | 230—127 |
| 1,032,287 | 7/1912 | Kreher | 103—115 |
| 1,075,300 | 10/1913 | Moss | 230—127 |
| 1,843,088 | 1/1932 | Minnard | 230—134.1 |
| 2,111,136 | 3/1938 | Bauer | 230—134.1 |
| 2,143,335 | 1/1939 | Toler | 230—134.45 |
| 2,344,444 | 3/1944 | Malczewski | 230—134.45 |
| 2,484,554 | 10/1949 | Concordia et al. | 230—134.45 |
| 3,059,833 | 10/1962 | Benoit | 230—134.45 |

FOREIGN PATENTS

| | | |
|---|---|---|
| 1,250,210 | 11/1960 | France. |
| 278,958 | 10/1914 | Germany. |
| 2,233 | 1878 | Great Britain. |
| 3,253 | 1878 | Great Britain. |

MARK NEWMAN, *Primary Examiner.*

HENRY F. RADUAZO, *Examiner.*

DONLEY J. STOCKING, *Assistant Examiner.*